Jan. 18, 1944  E. A. ROBERTS  2,339,540
TIRE CONSTRUCTION
Filed April 27, 1940
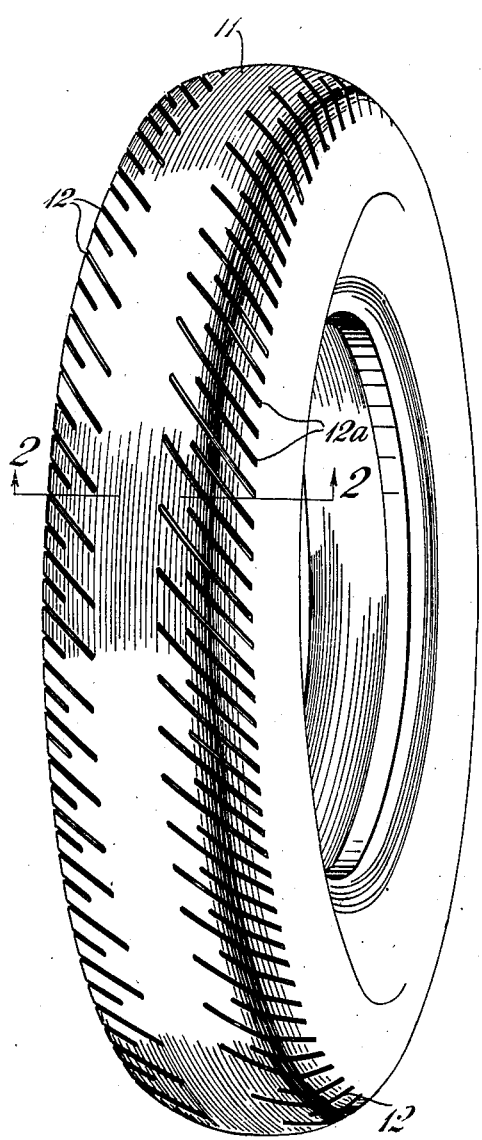
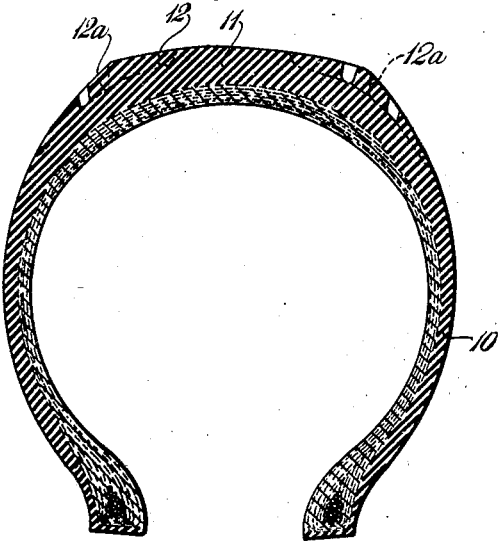
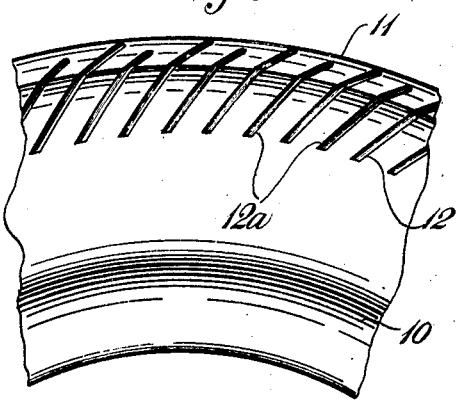
INVENTOR
Eugene A. Roberts
BY
Ely & Frye
ATTORNEY Patented Jan. 18, 1944

2,339,540

UNITED STATES PATENT OFFICE 2,339,540

TIRE CONSTRUCTION

Eugene A. Roberts, Akron, Ohio, assignor to The Firestone Tire & Rubber Company, Akron, Ohio, a corporation of Ohio Application April 27, 1940, Serial No. 332,004

2 Claims. (Cl. 152—209)

This invention relates to tire constructions, and more especially it relates to the design of the tread portions of pneumatic tire casings.

The invention is directed particularly to the tires of motor vehicles used in speed contests on race tracks, such as the Indianapolis speedway, where the vehicles travel over an endless, hard-surfaced roadway in a counter-clockwise direction, all curves or turns being toward the left. Under these conditions, skidding of the vehicle always is in the same direction. At the high speeds attained on this speedway, there is always more or less skidding at the turns, and such skidding is not objectionable, provided the tires maintain their contact with the roadway. However, if the tires have too much side traction, that is, if the tread elements are such as strongly to resist lateral skid, they cause the wheels of the vehicle to chatter and bounce with the result that there is a definite loss of traction with resulting loss of speed.

The chief object of the invention is to provide a tire for racing vehicles that will not chatter and bounce while skidding on a hard surfaced roadway. A further object is to provide a tread construction for racing tires that will be safer than prior constructions due to reduction of internal heat. More specifically, the invention aims to reduce the generation of internal heat in a tire by providing a tire construction wherein the hinge axis, that is, the line of relative flexure between the sidewalls and the tread of the tire, follows a devious, zig-zag course, so that concentrated or localized flexing is reduced; and to provide a tire in which the hinge axis is not on a direct line circumferentially of the tire or at the normal locus of hinging action.

Other objects will be manifest as the description proceeds.

Of the accompanying drawing:

Figure 1 is a perspective view of a pneumatic vehicle tire embodying the invention;

Figure 2 is a section on the line 2—2 thereof on a larger scale;

Figure 3 is a fragmentary side elevation of the tire; and

Figure 4 is a sectional detail of one of the grooves that extend laterally from the tread portion of the tire.

Referring now to the drawing, there is shown a pneumatic tire casing 10 of any known or preferred construction. The distinguishing characteristic of the tire resides in the tread portion 11 thereof, the same being normally smooth in a medial region which extends somewhat short of the respective lateral shoulders of the tread, which are the hinge points where flexing occurs due to flattening of the ground-engaging portion of the tire under the weight of a vehicle. The omission of the usual grooves entirely across the tread of the tire, or circumferentially thereof, eliminates a multiplicity of flexing points, since a tire tread always is more flexible in the bottom of grooves than elsewhere. Since flexure produces internal heat in a tire, and heat ultimately results in failure of the cords of the carcass of the tire, it will be seen that omission of the tread grooves described constitutes a safety feature that prevents localized flexure and thereby prolongs the life of the tire.

The tire is formed on opposite sides thereof with circumferential series of grooves 12, 12a, all of which grooves extend in the same direction, and are obliquely disposed with relation to the centerline of the tread. The grooves 12 and 12a extend from the opposite shoulders of the tire onto the respective sides, thereof, and the inner ends of the grooves 12 extend axially inwardly of the grooves 12a so that the ends of the grooves are staggered with relation to each other, said inner ends of the grooves also being of gradually diminishing depth toward their terminus on the tread of the tire. Likewise the outer end portions of the grooves, on the sides of the tire, are of gradually diminishing depth as is clearly shown in Fig. 2. Preferably the bottoms of the grooves are rounded as shown in Figure 4. The primary function of the grooves 12 and 12a is to prevent the tire from hinging on a straight circumferential line. The staggered endings of the grooves 12 and 12a provide a series of points of increased flexibility across the normal circumferential hinge-flexing line, and thereby stagger the circumferential flexing hinge points on each shoulder of the tire. The arrangement results in less localized flexing at the hinge points of the tire and thereby makes for longer life thereof.

The grooves 12, 12a also serve to show the amount of tread remaining on a tire as said tread wears down, and they exert a desirable cooling effect at the shoulders of the tire. The tires are mounted on a racing vehicle with the angular grooves 12, 12a in contact with the ground disposed parallel to the direction of outward skid of a car making a left turn or moving in a counter-clockwise course, the arrangement being such that the grooves do not grip the track, and chatter and bounce are eliminated.

Modification may be resorted to without departing from the spirit of the invention, or the scope thereof as defined by the appended claims.

What is claimed is:

1. A pneumatic vehicle tire comprising a tread portion, and having respective circumferential series of grooves in opposite sidewalls of the tire extending into the said tread portion thereof, said grooves being obliquely disposed with relation to the centerline of the tread and all those on one side extending in the same direction as those on the opposite side, both of said series of grooves terminating in regions of the tread that are nearer to the lateral margins thereof than to the centerline so as to provide a relatively wide and smooth ungrooved medial circumferential region on the tread, the end portions of the grooves of each series that are disposed on said tread being alternately short and long and being in a region of the tread that comprises a circumferential hinge-flexing line of the tread, which hinge flexing line follows a zig-zag course as the result of the offset ends of adjacent grooves.

2. A combination as defined in claim 1 wherein the grooves are of progressively diminishing depth toward their opposite ends with the result that chatter and bounce are eliminated as the tire is driven in service.

EUGENE A. ROBERTS.